United States Patent [19]

Rogstad

[11] Patent Number: 4,850,297
[45] Date of Patent: * Jul. 25, 1989

[54] LAMINATE STRUCTURE AND BOAT HULL MADE THEREFROM

[76] Inventor: Keith L. Rogstad, 11337 Durland Ave., NE., Seattle, Wash. 98125

[*] Notice: The portion of the term of this patent subsequent to Apr. 26, 2005 has been disclaimed.

[21] Appl. No.: 157,971

[22] Filed: Feb. 18, 1988

Related U.S. Application Data

[63] Continuation of Ser. No. 1,811, Jan. 8, 1987, Pat. No. 4,739,722.

[51] Int. Cl.⁴ .......................... B63B 3/12; B63B 5/24
[52] U.S. Cl. ...................................... 114/356; 114/357
[58] Field of Search ............................ 428/416, 425.8; 114/355, 356, 357; 293/109

[56] References Cited

U.S. PATENT DOCUMENTS

| | | | |
|---|---|---|---|
| 2,693,922 | 11/1954 | Ellison et al. | 114/357 |
| 3,143,457 | 8/1964 | Morris | 428/319.1 |
| 3,160,549 | 12/1964 | Caldwell et al. | 428/319.1 |
| 3,195,154 | 7/1965 | Swanson | 114/356 |
| 3,211,814 | 10/1965 | Kohrn et al. | 156/212 |
| 3,439,366 | 4/1969 | Matthews | 114/357 |
| 3,467,569 | 9/1969 | Weber et al. | 428/319.9 |
| 3,496,058 | 2/1970 | Schroter et al. | 428/319.1 |
| 3,533,901 | 10/1970 | Sutker | 428/319.9 |
| 3,598,671 | 8/1971 | Wortman et al. | 156/73 |
| 3,615,969 | 10/1971 | Hegg | 156/78 |
| 3,640,832 | 2/1972 | Kurz | 428/319.9 |
| 3,654,012 | 4/1972 | Schlager | 156/212 |
| 3,911,190 | 10/1975 | Myers et al. | 428/315 |
| 4,061,815 | 12/1977 | Poole, Jr. | 428/425.8 |
| 4,133,930 | 1/1979 | Wright et al. | 428/315 |
| 4,134,610 | 1/1979 | Lindewall | 293/71 R |
| 4,276,844 | 7/1981 | Fremont | 114/39 |
| 4,453,357 | 6/1984 | Zwilgmeyer | 52/309.8 |
| 4,457,729 | 7/1984 | Peerlkamp | 441/74 |
| 4,500,596 | 2/1985 | Lee | 428/317.5 |
| 4,739,722 | 4/1988 | Rogstad | 114/356 |

FOREIGN PATENT DOCUMENTS 1449922 8/1966 France .................. 114/357

Primary Examiner—Sherman D. Basinger
Attorney, Agent, or Firm—Seed and Berry

[57] ABSTRACT

A laminate structure and an aluminum open-hulled boat made therefrom. In one embodiment of the laminate structure, an aluminum outer hull layer has adhered thereto a resilient foam layer for absorbing energy that deforms the aluminum outer hull layer. In another embodiment, the laminate structure includes a harder supporting foam layer adhered to the resilient foam layer. In both embodiments, the resilient layer absorbs the energy of deformation of the aluminum outer hull layer, restores the aluminum outer hull to its original shape when the deforming stresses are removed. An inner rigid sheet that is adhered to the innermost inward surface of a foam layer without direct mechanical attachment to the outer hull layer, and the laminate structure provides sufficient structural support to the hull to not require additional cross-supports. A rigid, self-supporting open-hulled aluminum boat can be contructed from either of these laminate structures. Transverse bulkheads are attached to the inner rigid sheet to support a deck.

23 Claims, 1 Drawing Sheet

LAMINATE STRUCTURE AND BOAT HULL MADE THEREFROM

This application is a continuation of U.S. Pat. application Ser. No. 001,811 filed Jan. 8, 1987, now issued as U.S. Pat. No. 4,739,722 on Apr. 26, 1988.

TECHNICAL FIELD

The present invention relates to boat hulls, and more particularly, to open-hulled aluminum boats.

BACKGROUND OF THE INVENTION

It is known in the prior art to build aluminum-hulled boats made from sheet aluminum. Since they are light, such boats have found great popularity for various aquatic activities, such as fishing and motorboating. Because of their light construction, aluminum boats typically need bulkheads and other cross-braces extending transversely between the opposing hull sides in order for the boats to be sufficiently rigid. In many boats, the cross-braces also serve as bench seats. These cross-braces are typically held in place by rivets projecting through holes in the thin-skinned hull below or close to the water line. Unfortunately, rivets are also potential leak sites. Because of the need to include the cross-braces and use many rivets, construction of such aluminum-hulled boats is labor intensive and the boats are consequently more expensive. The cross-braces also add weight to the boat. As such, it is not possible to make a light aluminum hull boat with an open hull design since cross-braces are required to achieve sufficient strength. As noted above, these cross-braces frequently take the form of bench seats, even in boat designs where several midships' bench seats are not desired and an open hull with a single swivel seat and console arrangement is preferred.

With conventional construction of aluminum boats, the requirement to add bench seats as cross-braces, and the mechanisms sometimes used to distribute the load placed on the seats to the hull bottom so as not to be all supported by the rivet points to the hull sides, render it infeasible to add an interior flat deck to the boat. The extra weight and the necessary riveting of floor supporting braces to the boat hull further deter the use of interior decking. As such, the user must walk on the curved interior side of the hull bottom, which is less comfortable and provides a less stable than desired platform on which to stand or place equipment.

While aluminum sheets used for boat hulls are relatively light, they also have a relatively high modulus of elasticity. Accordingly, trailerable aluminum-hulled boats frequently suffer permanent deformations to their hulls at the trailer support points. This is due to the stresses produced by the trailer supports applying large localized pressures against the hull. The problem is more severe the greater the weight of the hull and the more articles which are in or attached to the hull while being trailered, such as an outboard motor. The problem is compounded when the boat, after loaded on the trailer, is used to carry extra weight, such as fishing, camping and other sporting gear. As a result of the susceptibility to permanent deformation, aluminum boat manufactures recommend users never load their boats on trailers of the type where rollers support the boat hull. Although most modern trailers use rollers since they are more convenient and make boat loading easier and safer, the limited number of rollers used apply too great a concentration of force on the hull. Thus, aluminum boat owners are relegated to using the old style bunk trailers which support the boat hull on long, flat planks usually covered with a soft material.

Not only are hull deformations unsightly, but they lead to a decrease in operating efficiency due to the increased hull drag. In addition, flexing at these points of deformation can lead to hull failure and leakage through nearby rivet holes.

Another problem common to aluminum hull boats is the vibration, noise and general pounding of the water on the hull which is transferred to the boat occupants, thus making for a less enjoyable and more fatiguing boat ride.

While it is known in the prior art to use foams in certain boat constructions to provide additional flotation and to deaden sound, the low density foams used tend to deteriorate due to wave impact and vibration. As a result, these low density foams are not recommended for use in hulls of planing boats.

DISCLOSURE OF THE INVENTION

It is an object of the present invention to provide a laminate boat hull structure capable of returning to its unstrained shape after being subjected to concentrated stresses.

It is another object of the present invention to provide a laminate boat hull structure with a rigid inner sheet that will support the fasteners without fastening through the outer layer.

It is a further object of the present invention to provide a rigid open-hulled aluminum boat that does not need internal cross-braces.

It is still another object of the present invention to provide an open-hulled aluminum boat that can have internal fixtures, such as decks, without the need to apply fasteners through the outer hull.

In general, the laminate boat hull structure of the present invention comprises a deformable high modulus outer hull layer having a predetermined unstrained shape and a resilient foam layer adhered to an inward side of the outer layer. The resilient foam layer has a sufficiently low compressive modulus to absorb energy through the outer layer when the outer layer is deformed from its unstrained shape and releases the energy to the outer layer when the stress is removed, thereby forcing the outer layer to return to its unstrained shape. In one embodiment, the laminate structure can further comprise a supporting foam layer adhered to the resilient foam layer, the supporting foam layer being harder than the resilient foam layer. The laminate structure can also comprise an inner rigid sheet adhered to an inward surface of the outermost foam layer, the structure being substantially vibrationally isolated from the outer hull layer and out of direct mechanical engagement with the outer hull layer.

The invention also comprehends an open-hulled aluminum boat having a predetermined unstrained outer shape, the boat having a watertight, deformable aluminum outer hull layer. The boat further has a resilient foam layer adhered to an inward side of the outer hull layer, the resilient foam layer damping boat vibrations and absorbing energy through the outer hull layer when the outer hull layer is deformed from its unstrained shape and releasing the energy to the outer hull layer when the stress is removed. The foam thereby forces the outer hull layer to return to its unstrained shape. The open-hulled aluminum boat also includes an inner rigid sheet, adhered to an inward side of the resilient foam layer and vibrationally isolated from the outer hull layer and out of direct mechanical engagement therewith. The combined resilient foam layer and inner rigid sheet provide sufficient structural strength support to the outer hull layer to avoid the need for cross-bracing extending between the hull sides. The open-hulled aluminum boat can further comprise one or more transverse bulkheads, the bulkheads being fastened to the inner rigid sheet and supporting a deck above the inner rigid sheet.

BEST MODE FOR CARRYING OUT THE INVENTION

Figure 1:
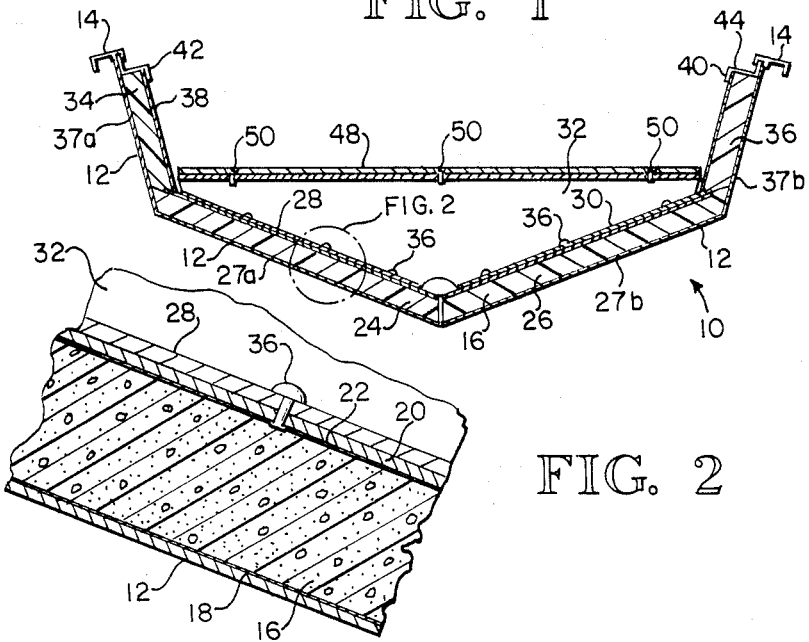
FIG. 1 is a cross-sectional view of an aluminum boat built with a first embodiment of a laminate structure of the present invention.

With reference to FIG. 1 of the drawings, an aluminum boat 10 is shown as comprising a watertight, deformable high modulus aluminum outer hull layer 12. The outer hull layer 12 can typically be made from a single sheet or joined panels of aluminum, approximately 0.063 inches thick, thereby providing a watertight layer. The upper edges of outer hull layer 12 can be fitted with a gunwale 14 made from extruded aluminum and fastened by rivets to the outer hull layer 12.

Figure 2:
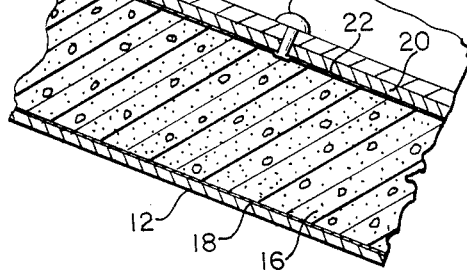
FIG. 2 is an enlarged, cross-sectional view of the laminate structure shown in FIG. 1.

As best shown in the enlarged, cross-sectional view of FIG. 2, the hull, according to the present invention, is formed of a laminate structure including the outer hull layer 12 and a resilient foam layer 16 adhered to an inward surface of outer hull layer 12. An adhesive layer 18 is provided between layers 12 and 16. The resilient foam layer 16 can be considerably thicker than outer hull layer 12, for example, one inch thick. The foam layer 16 serves not only to dampen boat hull vibrations and noise and to provide some flotation, but also serves to restore the outer hull layer 12 to its unstrained shape when subjected to concentrated stresses such as when loaded on a roller trailer for transit. This latter function is served by selecting a resilient foam layer 16 having sufficient resiliency, low compressive modulus and thickness to absorb energy transmitted through the outer hull layer as the outer hull layer is deformed from its unstrained shape under a force otherwise sufficient to permanently deform the aluminum outer hull layer, and then to release the energy to the outer hull layer when the deforming stress is removed. By so distributing the loading, no permanent deformation is realized. The resilient foam layer 16 can be selected with sufficient resiliency to handle the maximum anticipated point loading on the outer hull layer, such as from a roller of a roller trailer so as to allow the aluminum to deform, but not past its elastic limit which would cause permanent deformation. The effective yield strength of the hull structure is thereby increased. The resilient foam layer 16 can be manufactured of Voltek Minicell-/Volare or DOW ethafoam or a cross-linked polyfoam.

The resilient foam layer 16 also serves as a shock absorber to reduce the effect of wave pounding on the boat occupants and to deaden noise, thus providing a more enjoyable ride. Since the foam used is a relatively soft foam, the degradation realized with rigid foams when used in planing boats due to wave impact does not occur. Another advantage of the soft foam is that it can be easily deformed to match the shape of the boat hull and to match irregularities in the surface to which it is to be adhered. This promotes good contact for bonding to the hull layer 12.

The laminate structure in FIG. 2 further includes an inner rigid sheet 20 that is adhered to an inward side of resilient foam layer 16 by an adhesive layer 22. The inner rigid sheet 20 can, for example, be an aluminum sheet 0.050 inches thick, although other sheet materials, such as rigid plastic, can be used as well. As will be described in more detail below, with this laminate structure, a sufficient structural support is provided to the outer hull layer 12 so that an open-hulled boat construction is possible without requiring cross-braces extending between and fastened to the hull sides. The laminate structure serves as a structural beam, but yet allows the hull bottom to work as it engages the waves. Much as with the currently popular flexible, rubber boats, the aluminum boat 10 of the present invention achieves increased strength and wave handling capability through its increased flexibility over conventional aluminum boats using rigid cross-bracing/framing. The approach is contrary to conventional teachings to make aluminum boats stronger by making them more rigid through increasing the rigidity of the framing and the wall thickness of the aluminum hull used. By using the laminate structure, the foam layer 16 and the rigid but yet somewhat flexible cover sheet 20 give and allow movement of the hull in response to wave impact. Since no rivets or rigid cross-braces are used, the movement does not affect the integrity of the hull. The energy of the wave impact and even point loading from trailer rollers is distributed to an enlarged area and absorbed by the foam and given back to the hull to restore it to the unstrained shape.

Returning to FIG. 1, it can be seen that aluminum boat 10 can be constructed with the resilient foam layer 16 being formed by adhering separate left and right side elongated resilient foam layers 24 and 26, respectively, to the left and right inward surfaces 27a and 27b of the bottom of the outer hull layer 12. Next, the inner rigid sheet 20 is formed by a pair of left and right side elongated inner rigid sheets 28 and 30, respectively, which are adhered over the corresponding left and right side resilient foam layers 24 and 26. The inner rigid sheets 28 and 30 are cut to size so that their adjacent edges are spaced apart from each other and their outer edges are spaced apart from the outer hull layer 12 forming the sides of aluminum boat 10. The resilient foam layers 24 and 26 extend substantially the full length of the boat 10, and the inner rigid sheets 28 and 30 extend coextensive therewith.

Next in the construction of the aluminum boat shown in FIG. 1, a pair of left and right side elongated resilient foam layers 34 and 36, respectively, are adhesively attached to the left and right inward surfaces 37a and 37b of the side panels of the outer hull layer 12. Then, a pair of left and right elongated inner rigid sheets 38 and 40, respectively, are adhered over the corresponding left and right side resilient foam layers 34 and 36. To maximize the degree of vibration isolation of inner rigid sheets 38 and 40 from the outer hull layer 12, rigid sheets 38 and 40 should not contact the inner rigid sheets 28 and 30 or the outer hull layer 12. If desired, the exposed upper edge of the laminate structure adhered to the side panels of the aluminum boat can be capped and thereby protected by Z-brackets 42 and 44, which are each held in place by being attached to the gunwale 14.

The aluminum boat 10 construction, as described above, exhibits sufficient rigidity to require little, if any, cross-bracing between the hull sides even when used in a high speed planing boat. As such, the usual cross-bracing can be eliminated and the weight and manufacturing cost associated therewith eliminated. No additional internal framing is required. Moreover, the need to rivet through the outer hull layer 12 at or below the water line no longer exists. This results in substantial material and labor savings, and produces a more desirable and better performing boat.

If it is desirable to provide the boat 10 with interior decking, such as to build a boat using a freestanding steering console and a swivel chair (not shown), a deck supporting cross-member 32 can be attached to the inner rigid sheets 28 and 30 using fasteners, such as blind rivets 36. A rigid deck 48 may then be fastened to the cross-member 32 and fixtures may be fastened to the deck. By using the hull laminate structure of the present invention, it is possible to provide a flat deck and attach fixtures to the interior of boat 10 without piercing the outer hull layer 12. Since the basic hull construction is lighter since cross-braces are not required, the additional weight of the decking is acceptable.

The cross-member 32 can be made from aluminum or any other suitable material, and the deck 48 can be made from plywood. The deck 48 can be attached to cross-member 32 by fasteners 50, for example, self-threading screws. While not necessary for the construction of most boats, the cross-supports 32 also serve to provide additional cross-bracing for the outer hull layer 12 without riveting through the outer hull layer and while totally inhibiting the beneficial flexibility that the laminate structure of the present invention provides.

It has been found that forces that would otherwise deform the outer hull layer 12 from its unstrained shape are distributed throughout the resilient foam layer 16. When the stresses to outer hull layer 12 are removed, the forces distributed within resilient foam layer 16 then counteract the deformation of outer hull layer 12 from the interior of the hull, restoring the layer 12 to its unstrained shape. In addition, resilient foam layer 16 serves to vibrationally isolate outer hull layer 12 from the interior of the hull and to absorb the energy of wave impact, thereby providing a substantially smoother, quieter, and softer ride to the occupants of the boat. Similarly, the resilient foam layer absorbs the energy imparted to the outer hull layer 12 by boat trailer rollers, even when travelling over bumpy roads with the boat loaded with equipment thus preventing damage to the hull. In both situations, the absorbed energy is also prevented from causing stress and strain induced deterioration on any aluminum seams making up the outer hull layer 12, whether they be welds, rivets or other means for mechanically joining the aluminum sheet panels comprising many hulls.

Figure 3:
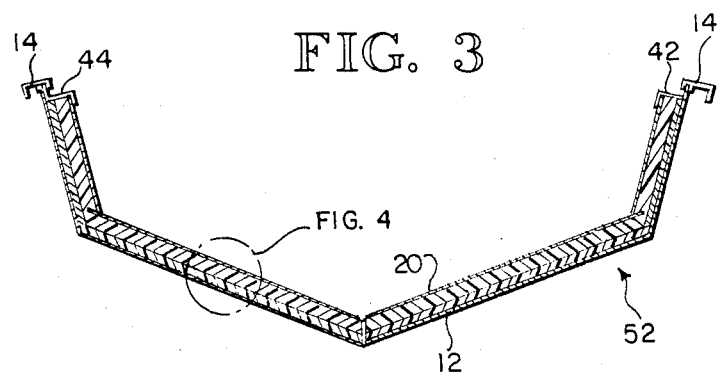
FIG. 3 is a cross-sectional view of an open-hulled aluminum boat built with a second embodiment of the laminate structure of the present invention.
Figure 4:
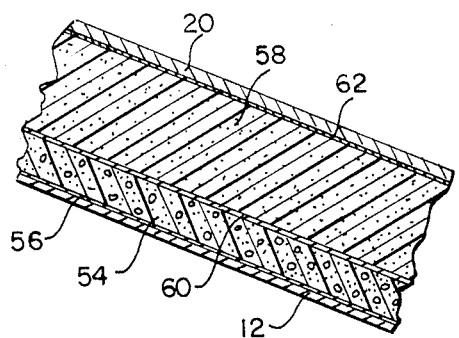
FIG. 4 is an enlarged, cross-sectional view of the laminate structure shown in FIG. 3.

In FIG. 3, an alternative embodiment of the open-hulled aluminum boat is shown, and indicated by reference numeral 52. The boat 52 is constructed using another embodiment of the laminate structure of the present invention. An enlarged, cross-sectional view of this embodiment is shown in FIG. 4, and includes a resilient foam layer 54 adhered to an inward side of the outer hull layer 12 by an adhesive layer 56. In the presently preferred embodiment, resilient foam layer 54 is $\frac{3}{8}$ inch thick. A supporting foam layer 58 is adhered to an inward surface of the resilient foam layer 54 through an adhesive layer 60. The supporting foam layer 58 is chosen to be harder and thicker than resilient foam layer 54, and in this embodiment is one inch thick. An inner rigid sheet 20 is adhered to an inward surface of supporting foam layer 58 by an adhesive layer 62. By using two foam layers with different stiffnesses and other properties, a laminate structure can be achieved with different characteristics. For example, a harder, more brittle foam may be used as the supporting foam layer 58 to realize its advantages, while a softer foam is used as the resilient foam layer 54 to provide the advantages described above and also to protect the harder foam from deterioration.

Referring again to FIG. 3, open-hulled aluminum boat 52 can be constructed by separately adhering resilient foam layer 54, then supporting foam layer 58, and finally inner rigid sheet 20, one to the next, using left and right side sheets, in a manner similar to that described for the construction of boat 10 of FIG. 1. Alternatively, the laminate of resilient foam layer 54, supporting foam layer 58, and inner rigid sheet 20 can be preassembled. The preassembled laminate can then be cut to proper shape and adhered to an inward surface of outer hull layer 12 to form the desired laminate structure.

FIGS. 1 and 3 show the laminate structure of the present invention applied to the bottom and side inward surfaces of outer hull layer 12. It will, however, be apparent to those skilled in the art that the laminate structure need only be applied to selected portions of the inward surface of outer hull layer 12, for example, the inward surfaces of the bottom of the outer hull layer 12. While it is desirable to use a laminate structure which extends the full length of the boat, shorter sections may be used, and less than the entire hull length may be constructed with the laminate structure.

It will be appreciated that, although specific embodiments of the invention have been described herein for purposes of illustration, various modifications may be made without departing from the scope of the invention. Accordingly, the invention is not limited except by the appended claims.

I claim:

1. A laminate boat hull structure capable of returning to its unstrained shape after being subjected to concentrated stresses, the structure comprising:
    a deformable, high modulus outer layer having a predetermined unstrained shape;
    a preformed resilient and flexible foam layer adhered to the inward side of the outer layer, the resilient foam layer having a sufficiently low compressive modulus to substantially absorb energy through the outer layer when the outer layer is performed from its unstrained shape by a concentrated stress and release the energy to the outer layer when the stress is removed, to force the outer layer to return to its unstrained shape; and
    an inner rigid sheet adhered to the resilient foam layer.

2. The laminate boat hull structure of claim 1, wherein the inner rigid sheet is made from aluminum.

3. The laminate boat hull structure of claim 1, further comprising:

a supporting foam layer adhered to the resilient foam layer, the supporting foam layer being harder than the resilient foam layer; and the inner rigid sheet being adhered to the supporting foam layer.

4. The laminate boat hull structure of claim 3, wherein the supporting foam layer is thicker than the resilient foam layer.

5. The laminate boat hull structure of claim 3, wherein the inner rigid sheet is made from aluminum.

6. A boat having a predetermined, unstrained outer shape, comprising:

a watertight, deformable high modulus outer hull;

a resilient and flexible foam layer preformed prior to positioning within the outer hull and adhered to an inward side of the outer hull, the resilient foam layer having a sufficiently low compressive modulus to substantially dampen boat vibrations and absorb energy through the outer hull when the outer hull is deformed from its unstrained shape and release the energy to the outer hull when the stress is removed, to force the outer hull to return to its unstrained shape; and an inner rigid sheet, adhered to an inward side of the resilient foam layer and substantially vibrationally isolated from the outer hull, the combined resilient foam layer and inner rigid sheet providing structural support for the outer hull under normal loading during use.

7. The boat of claim 6, wherein the inner rigid sheet is made from aluminum.

8. The boat of claim 6, further comprising one or more transverse bulkheads, each bulkhead being fastened to the inner rigid sheet and free of fastening points to the outer hull.

9. The boat of claim 8, further comprising a deck supported away from the inner rigid sheet by at least one of the one or more transverse bulkheads.

10. A boat having a predetermined, unstrained outer shape, comprising:

a watertight, deformable high modulus outer hull layer;

a resilient and flexible foam layer preformed exterior of and prior to positioning within the outer hull layer and adhered to an inward side of the outer hull layer, the resilient foam layer having sufficiently low compressive modulus to substantially dampen boat vibrations and absorb energy through the outer hull layer when the outer hull layer is deformed from its unstrained shape and release the energy to the outer hull layer when the stress is removed, to force the outer hull layer to return to its unstrained shape;

a supporting foam layer adhered to an inward surface of the resilient foam layer, the supporting foam layer having a hardness and thickness selected to provide the desired passenger comfort or hull rigidity; and an inner rigid sheet, adhered to an inward side of the supporting foam layer and substantially vibrationally isolated from the outer hull layer.

11. The boat of claim 10, wherein the rigid inner sheet if made from aluminum.

12. The boat of claim 10, further comprising one or more transverse bulkheads, each bulkhead being fastened to the inner rigid sheet and out of direct contact with the outer hull layer.

13. The boat of claim 12, further comprising a deck supported away from the inner rigid sheet by at least one of the one or more transverse bulkheads and out of direct contact with the outer hull layer.

14. A rigid, self-supporting open-hulled boat, comprising:

a watertight, deformable high modulus hull having bottom and side outer panels extending between a bow and a transom;

a plurality of preformed resilient and flexible foam layers, each of the resilient foam layers being adhered to an inward surface portion of one of the bottom or side outer panels; and a plurality of contiguous inner rigid sheets, each of the rigid sheets being adhered to an inward surface of one of the resilient foam layers and substantially vibrationally isolated from and out of direct mechanical engagement with the outer panel to which the corresponding one resilient foam layer is adhered, each of the foam layers having a sufficiently low compressive modulus to substantially isolate the inner rigid sheets from concentrated forces impinging on the outer panels during normal usage.

15. The rigid, open-hulled boat of claim 14, wherein each of the inner rigid sheets is made from aluminum.

16. The rigid, open-hulled boat of claim 14, further comprising one or more transverse bulkheads, each bulkhead being fastened to the inner rigid sheet and out of direct mechanical engagement with the outer panels.

17. The rigid, open-hulled boat of claim 16, further comprising a deck supported away from the inner rigid sheet by at least one of the one or more transverse bulkheads and out of direct mechanical engagement with the outer panels.

18. A rigid, self-supporting open-hulled boat, comprising:

a watertight, deformable high modulus hull having bottom and side outer panels extending between a bow and a transom;

a plurality of preformed resilient and flexible foam layers, each of the resilient foam layers being adhered to an inward surface portion of one of the bottom or side outer panels;

a plurality of preformed contiguous supporting foam layers, each of the supporting foam layers being adhered to an inward surface of one of the resilient foam layers; and a plurality of contiguous inner rigid sheets, each of the rigid sheets being adhered to an inward surface of one of the supporting foam layers and substantially vibrationally isolated from and out of direct mechanical engagement with the outer panel to which the corresponding one resilient foam layer is adhered, the resilient foam layer having a sufficiently low compressive modulus to substantially isolate the inner rigid sheets form concentrated forces impinging on the outer panels during normal usage.

19. The rigid, open-hulled boat of claim 18, wherein each of the inner rigid sheets is made from aluminum.

20. The rigid, open-hulled boat of claim 19, further comprising one or more transverse bulkheads, each bulkhead being fastened to the inner rigid sheet and out of direct mechanical engagement with the outer panels.

21. The rigid, open-hulled boat of claim 20, further comprising a deck supported away from the inner rigid sheet by at least one of the one or more transverse bulkheads and out of direct mechanical engagement with the outer panels.

22. A method for constructing a boat having a predetermined, unstrained outer shape, comprising:
   providing a watertight, deformable high modulus outer hull;
   providing a resilient and flexible foam layer preformed exterior of and prior to positioning within the outer hull, the resilient foam layer being selected with a sufficiently low compressive modulus to substantially absorb the energy of concentrated forces deforming the outer hull from its unstrained shape during normal usage;
   adhering the resilient foam layer to an inward side of the outer hull, the resilient foam layer dampening boat vibrations and absorbing energy through the outer hull when the outer hull is deformed from its unstrained shape and releasing the energy to the outer hull when the stress is removed, thereby forcing the outer hull to return to its unstrained shape;
   providing an inner rigid sheet; and
   adhering the inner rigid sheet to an inward side of the resilient foam layer in substantially vibrational isolation from the outer hull, the combined resilient foam layer and inner rigid sheet providing structural support for the outer hull under normal loading during use.

23. The method of claim 22, further including:
   providing one or more transverse bulkheads;
   attaching each of the bulkheads to the inner rigid sheet and free of fastening points to the outer hull;
   providing a substantially planar deck; and
   attaching the deck to one or more of the transverse bulkheads free of fastening points to the outer hull.

* * * * *

UNITED STATES PATENT AND TRADEMARK OFFICE
CERTIFICATE OF CORRECTION

PATENT NO. : 4,850,297

DATED : July 25, 1989

INVENTOR(S) : Keith L. Rogstad

It is certified that error appears in the above-identified patent and that said Letters Patent is hereby corrected as shown below:

In claim 1, column 6, line 58, delete "performed" and substitute therefor --deformed--.

In claim 18, column 8, line 57, delete "form" and substitute therefor --from--.

Signed and Sealed this

Fifteenth Day of May, 1990

Attest:

HARRY F. MANBECK, JR.

*Attesting Officer*     *Commissioner of Patents and Trademarks*